US012758962B2

(12) United States Patent
Juang

(10) Patent No.: US 12,758,962 B2
(45) Date of Patent: Oct. 13, 2026

(54) ROTARY PIPETTING DEVICE

(71) Applicant: ZINEXTS LIFE SCIENCE CORP., New Taipei (TW)

(72) Inventor: Jia-Lin Juang, New Taipei (TW)

(73) Assignee: ZINEXTS LIFE SCIENCE CORP., New Taipei (TW)

( * ) Notice: Subject to any disclaimer, the term of this patent is extended or adjusted under 35 U.S.C. 154(b) by 340 days.

(21) Appl. No.: 18/739,289

(22) Filed: Jun. 10, 2024

(65) Prior Publication Data

US 2024/0326035 A1 Oct. 3, 2024

Related U.S. Application Data

(63) Continuation of application No. PCT/CN2022/113326, filed on Aug. 18, 2022.

(51) Int. Cl.
*B01L 3/02* (2006.01)

(52) U.S. Cl.
CPC .................................. *B01L 3/0227* (2013.01)

(58) Field of Classification Search
None
See application file for complete search history.

(56) References Cited

U.S. PATENT DOCUMENTS 8,337,754 B2 * 12/2012 Emery ............. G01N 35/00029 422/65
2020/0018775 A1 * 1/2020 Fujii ......................... B01L 7/00

* cited by examiner

*Primary Examiner* — Suman K Nath

(57) ABSTRACT

The present invention relates to a rotary pipetting device comprising a plurality of pipetting assemblies and a driving motor. Each pipetting assembly comprises a shaft rod, a connecting portion, and a pipette tip; a return spring is mounted at the top of the shaft rod, and a gear is sleeved on the shaft rod; the connecting portion is disposed at the bottom of the shaft rod; the pipette tip is connected to the connecting portion. An output shaft of the driving motor is connected to a rotating gear, the rotating gear is engaged with a transmission member. When power is supplied to the driving motor, the power output of the driving motor drives the transmission member to rotate, thereby driving the gear on the shaft rod to rotate and causing the pipette tip to rotate.

6 Claims, 8 Drawing Sheets

ROTARY PIPETTING DEVICE

CROSS REFERENCE TO RELATED APPLICATIONS

The present application is a Continuation application of PCT Application No. PCT/CN2022/113326 filed on Aug. 18, 2022, the contents of which are incorporated herein by reference in their entirety.

TECHNICAL FIELD

The present invention relates to the technical field of biological detection equipment, particularly to a rotary pipetting device.

BACKGROUND

At present, biotechnology has gradually developed and matured after years of practice. Therefore, biological detection technology has been formally applied to various fields, including food, medicine, public health, and other related areas, where it is widely utilized. In general, in biological detection technology, it is necessary to mix reagents and samples to conduct experiments or inspections, and liquid samples are typically sampled or transferred using pipettes.

The pipette, also known as a micropipette, can be used to draw and dispense small volumes of liquid samples, providing the samples needed for various experiments. The pipette creates a vacuum within a sealed cylinder by driving air out through a piston, which moves vertically within the cylinder, typically made of metal or ceramic. When the piston is drawn upwards, the rear half of the gas is compressed, creating a vacuum in the front half of the space. The liquid near the tip then enters the vacuum portion, allowing for transfer or dispensing as needed. However, pipettes rely on the movement and compression of gas, making their accuracy susceptible to environmental conditions, especially temperature and the operator's technique. Additionally, traditional pipettes only possess the functionality of transferring liquid, which has gradually become insufficient to meet people's needs.

In conclusion, the inventors of the present invention have devoted themselves to developing a solution to overcome the shortcomings and issues associated with the use of conventional pipettes and to address the demand for automation in large-scale operations to save time and manpower. The present invention still aims to serve the public and promote industry development. After extensive deliberation, the invention has been proposed.

SUMMARY

The main objective of the present invention is to provide a rotary pipetting device that can be used for biochemical reactions and can simultaneously handle large number of samples. Secondly, the rotary pipetting device of the present invention can suck and dispense minute volumes of sample liquid while also having stirring functionality.

To achieve the aforementioned objectives, the present invention provides a rotary pipetting device for sucking sample liquid. The rotary pipetting device comprises a plurality of pipetting assemblies and a driving motor. Each pipetting assemblies includes a shaft rod, a connecting portion, and a pipette tip. The shaft rod is utilized for sucking the sample liquid. A return spring for compressing the air inside the shaft rod is mounted on the top of the shaft rod. Furthermore, a gear is mounted on the shaft rod and disposed adjacent to the return spring. Additionally, the connecting portion disposed at the bottom of the shaft rod, with the pipette tip connected to it. The pipette tip includes a storage space for storing the sample liquid which is sucked during suction by the shaft rod. Furthermore, an output shaft of the driving motor is connected to a rotating gear engaged with a transmission assembly. Upon supplying power to the driving motor, the power output of the driving motor drives the transmission assembly to rotate. Consequently, the rotation of the transmission assembly drives the gear on the shaft rod to rotate, thereby inducing rotation of the pipette tip.

In an embodiment of the present invention, the rotary pipetting device further comprises a compression assembly including a compression plate, a compression shaft and a compression motor. The compression shaft passes through the compression plate and is arranged in parallel to the plurality of the pipetting assemblies. The compression plate is disposed above the plurality of the pipetting assemblies. The compression motor is connected to the compression shaft, and the power output of the compression motor is configured to be capable of driving the compression plate which is vertically movable on the compression shaft, to compress the return spring.

In an embodiment of the present invention, the transmission assembly is a limiting gear, a rack or a belt.

In an embodiment of the present invention, the power output of the driving motor is capable of driving the limiting gear to rotate, and the gears on the plurality of pipetting assemblies are arranged adjacent to each other and rotated mutually.

In an embodiment of the present invention, the rotary pipetting device further comprises a horizontal displacement assembly including a first motor, a conveying shaft, a shaft sleeve, a connecting plate and a horizontal displacement member. The first motor is connected to the conveying shaft, with the shaft sleeve sleeved on the conveying shaft. Additionally, the shaft sleeve passes through the connecting plate to fix the connecting plate on the shaft sleeve, and the bottom of the horizontal displacement member is connected to one side of the connecting plate. When power is supplied to the first motor, the power output of the first motor can drive the shaft sleeve to perform horizontal displacement along the conveying shaft, thereby driving the connecting plate and the horizontal displacement member to move horizontally.

In an embodiment of the present invention, the rotary pipetting device further comprises a vertical displacement assembly including a second motor, a transmission shaft, a housing and a vertical displacement member. The second motor is connected to the transmission shaft, the transmission shaft passes through the housing, and one side of the housing is connected to one side of the vertical displacement member. Additionally, the power output of the second motor is configured to be capable of driving the vertical displacement member to move vertically on the transmission shaft and thereby enabling a plurality of the pipetting assemblies to move a vertical displacement.

By comparing with existing technologies, the present invention has the following characteristics and advantages.

The present invention achieves the suction of sample liquid by setting up the return spring, the pipette tip and the compression assembly, replacing the previous piston-sleeve type liquid suction structure, thereby reducing the impact of environmental factors and operators on liquid suction accuracy.

The present invention achieves sample liquid stirring by setting up the rotating motor, the transmission assembly, and the gear on the shaft rod of the pipetting assemblies, enabling the pipette tip to rotate through the motor.

DESCRIPTION OF THE ATTACHED ICON NUMBER

1: rotary pipetting device; 10: pipetting assembly; 11: shaft rod; 111: return spring; 112: gear; 12: connecting portion; 13: pipette tip; 131: storage space; 20: driving motor; 201: output shaft; 21: rotating gear; 22: transmission assembly; 221: limiting gear; 222: belt; 223: rack; 30: compression assembly; 31: compression plate; 32: compression shaft; 33: compression motor; 40: horizontal displacement assembly; 41: first motor; 42: conveying shaft; 43: shaft sleeve; 44: connecting plate; 45: horizontal displacement member; 46: chemical reagent reservoir; 47: reaction chamber; 50: vertical displacement assembly; 51: second motor; 52: transmission shaft; 53: housing; 54: vertical displacement member.

DETAILED DESCRIPTION

Below, specific embodiments are used to illustrate the implementation of the present invention. Those skilled in the art can easily understand other advantages and effects of the present invention from the content disclosed in this specification. In addition, the present invention can also be implemented or applied through other different specific embodiments, and various modifications and changes can be made within the scope of the present invention.

To further understand the present invention based on the aforementioned advantages, a preferable embodiment is disclosed as follows. With reference to the accompanying drawings and figures, the technical solution and the achieved effects of the present invention are described in detail explained as follows.

Figure 1:
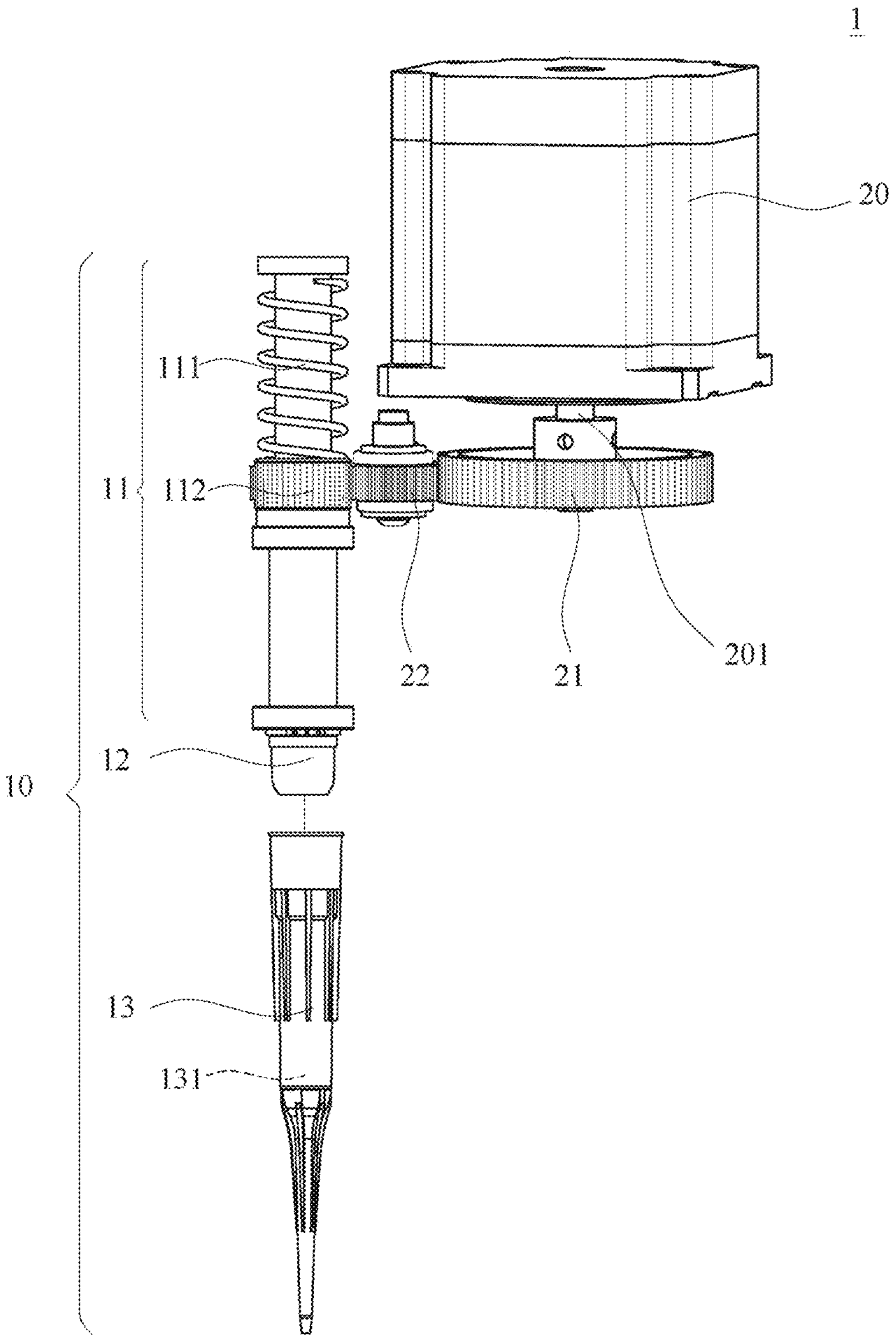
FIG. 1 is a structural schematic diagram of pipetting assemblies and a driving motor of the present invention.
Figure 2A:
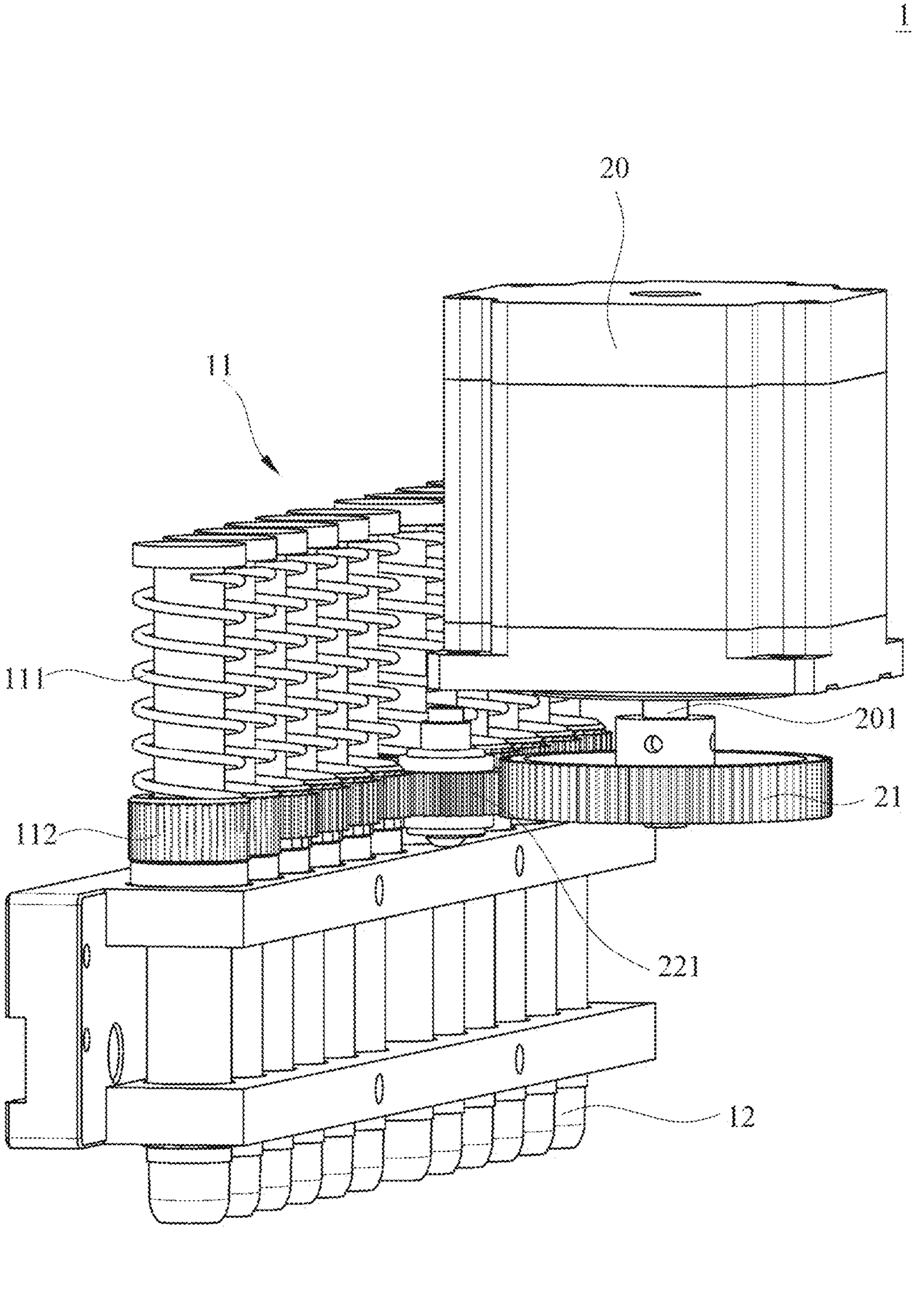
FIG. 2A is a structural schematic diagram of a limiting gear and the driving motor driving a plurality of pipetting assemblies of the present invention.

Please refer to FIG. 1 and FIG. 2A, FIG. 1 is a structural schematic diagram of pipetting assemblies and a driving motor of the present invention; and FIG. 2A is a structural schematic diagram of a limiting gear and the driving motor driving a plurality of pipetting assemblies of the present invention.

As shown in FIGS. 1 and 2A, the present invention provides a rotary pipetting device 1 designed for sucking sample liquid. The rotary pipetting device 1 comprises multiple pipetting assemblies 10 and a driving motor 20. Each pipetting assemblies 10 includes a shaft rod 11, a connecting portion 12, and a pipette tip 13. The shaft rod 11 is utilized for sucking the sample liquid. A return spring 111, mounted at the top of the shaft rod 11, compresses the air inside the shaft rod 11. Furthermore, a gear 12 is mounted on the shaft rod 11 and disposed adjacent to the return spring 111. Additionally, the connecting portion 12 disposed at the bottom of the shaft rod 11, with the pipette tip 13 connected to it. The pipette tip 13 features a storage space 131 wherein the sample liquid is contained during suction by the shaft rod 11. Furthermore, an output shaft 201 of the driving motor 20 is connected to a rotating gear 21 engaged with a transmission assembly 22. The transmission assembly 22 is a limiting gear 221. Upon supplying power to the driving motor 20, the power output of the driving motor 20 drives the transmission assembly 22 to rotate. Consequently, the rotation of the transmission assembly drives the gear on the shaft rod to rotate, thereby inducing rotation of the pipette tip. As shown in FIG. 2A, when the power output of the driving motor 20 drives the limiting gear 221 to rotate, the gears 112 on the plurality of pipette assemblies 10 are arranged adjacent to each other and rotate mutually.

Figure 2B:
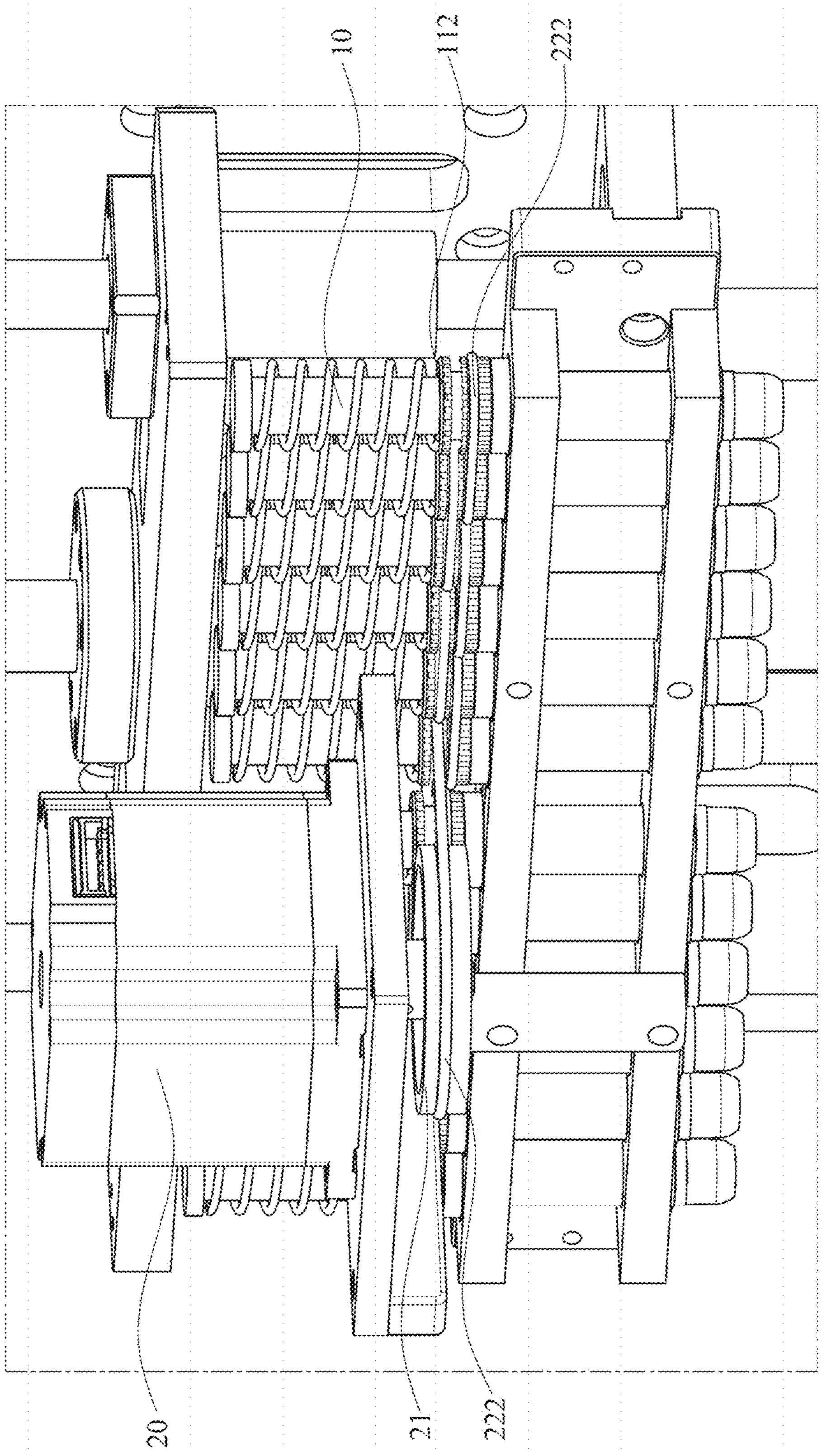
FIG. 2B is a structural schematic diagram of a belt and the driving motor driving a plurality of pipetting assemblies of the present invention.
Figure 2C:
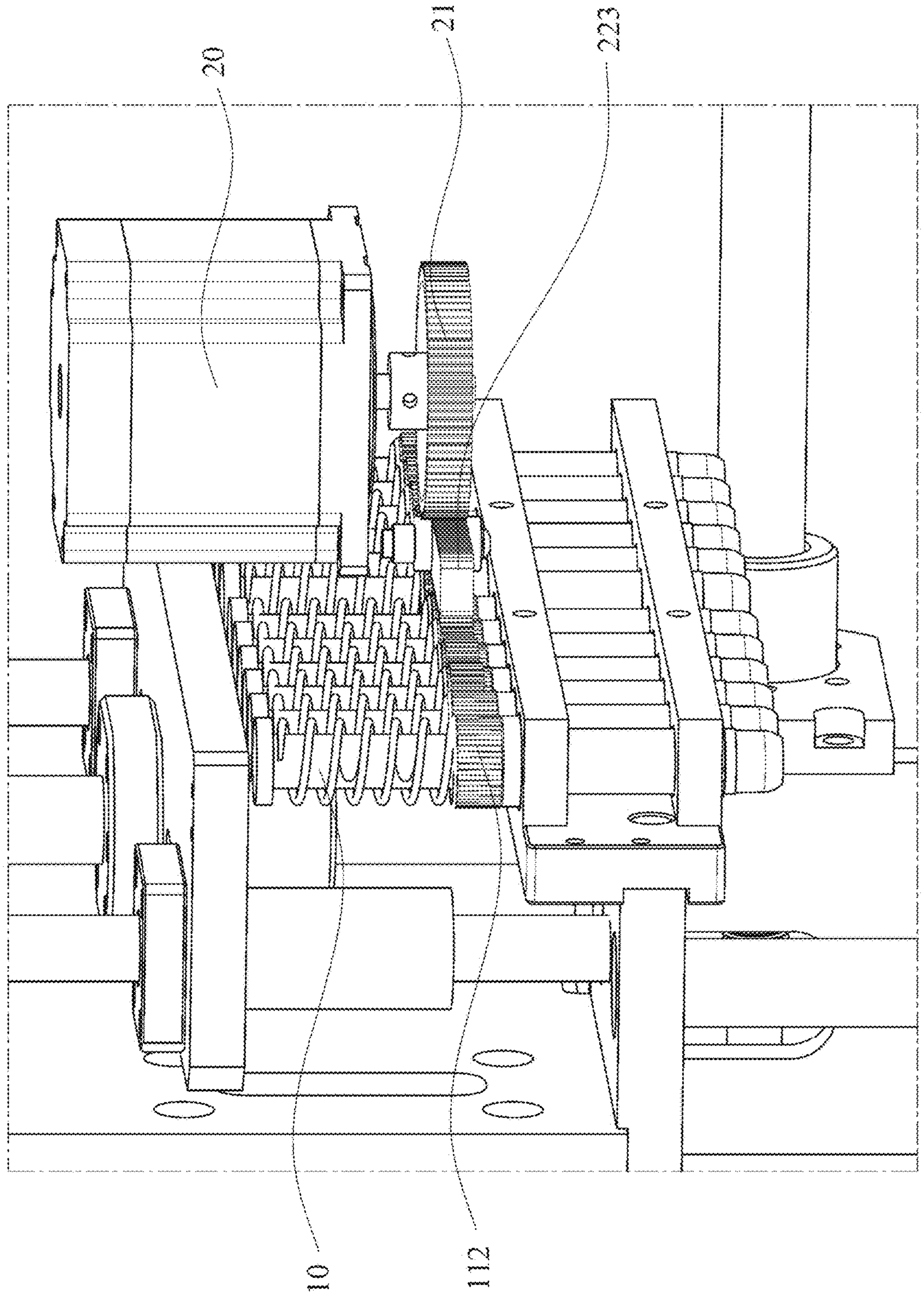
FIG. 2C is a structural schematic diagram of a rack and the driving motor driving a plurality of pipetting assemblies of the present invention.

Please refer to FIG. 2B and FIG. 2C, FIG. 2B is a structural schematic diagram of a belt and the driving motor driving a plurality of pipetting assemblies of the present invention; and FIG. 2C is a structural schematic diagram of a rack and the driving motor driving a plurality of pipetting assemblies of the present invention.

As shown in FIG. 2B, the transmission assembly 22 is a belt 222, which is arranged around the rotating gear 21 and the gear 112 of each pipette assembly 10. When the power output of the driving motor 20 drives the rotating gear 21, the rotating gear 21 drives the belt 222 to make the gears 112 rotate mutually. Furthermore, as shown in FIG. 2C, the transmission component 22 is a rack 223, which engaged with the rotating gear 21 and the gear 112. When the power output of the driving motor 20 drives the rotating gear 21, the rotating gear 21 drives the rack 223 to move, thereby causing the gears 112 to rotate mutually.

Figure 3:
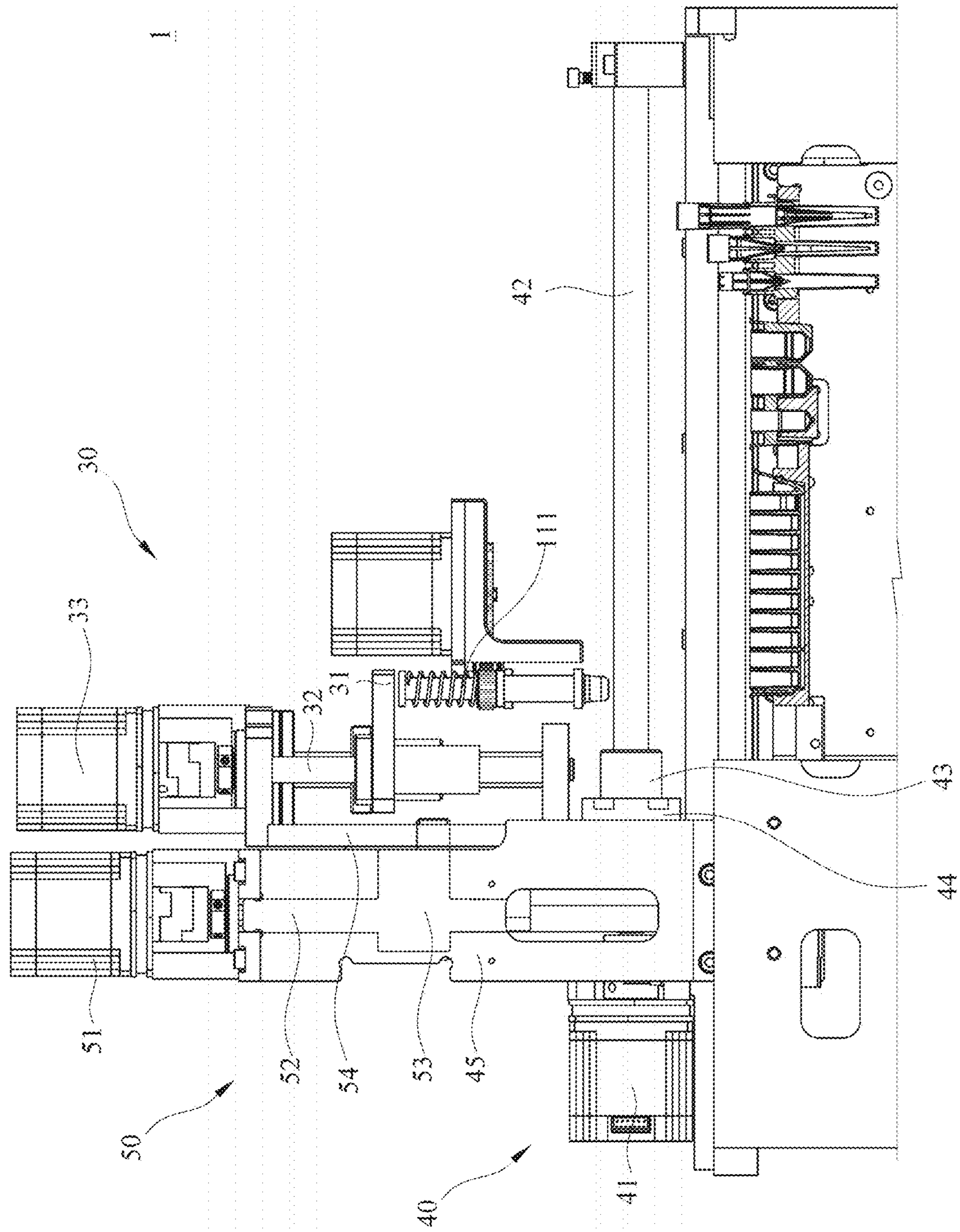
FIG. 3 is a structural schematic diagram of a rotary pipetting device of the present invention.

Please refer to FIG. 3, FIG. 3 is a structural schematic diagram of a rotary pipetting device of the present invention.

As shown in FIG. 3, the rotary pipetting device 1 further comprises a compression assembly 30, a horizontal displacement assembly 40, and a vertical displacement assembly 50. The compression assembly 30 includes a compression plate 31, a compression shaft 32 and a compression motor 33, the compression shaft 32 passes through the compression plate 31 and arranged in parallel to the plurality of the pipetting assemblies 10. The compression plate 31 is disposed above the plurality of the pipetting assemblies 10. The compression motor 33 is connected to the compression shaft 32, and the power output of the compression motor 33 is capable of driving the compression plate 31, which is vertically movable on the compression shaft 32, to compress the return spring 111. Furthermore, the horizontal displacement assembly 40 includes a first motor 41, a conveying shaft 42, a shaft sleeve 43, a connecting plate 44 and a horizontal displacement member 45. The first motor 41 is connected to the conveying shaft 42, with the shaft sleeve 43 sleeved on the conveying shaft 42. Additionally, the shaft sleeve 43 passes through the connecting plate 44 to fix the connecting plate 44 on the shaft sleeve 43, and the bottom of the horizontal displacement member 45 is connected to one side of the connecting plate 44. When power is supplied to the first motor 41, the power output of the first motor 41 is capable of driving the shaft sleeve 43 to perform horizontal displacement along the conveying shaft 42, thereby driving the connecting plate 44 and the horizontal displacement member 45 to move horizontally. Furthermore, the vertical displacement assembly 50 includes a second motor 51, a transmission shaft 52, a housing 53 and a vertical displacement member 54. The second motor 51 is connected to the transmission shaft 52, the transmission shaft 52 passes through the housing 53, and one side of the housing 53 is connected to one side of the vertical displacement member 50. The power output of the second motor 51 is capable of driving the vertical displacement member 50 to perform vertically displacement on the transmission shaft 52, thereby driving multiple pipette assemblies 10 to move vertically.

Figure 4:
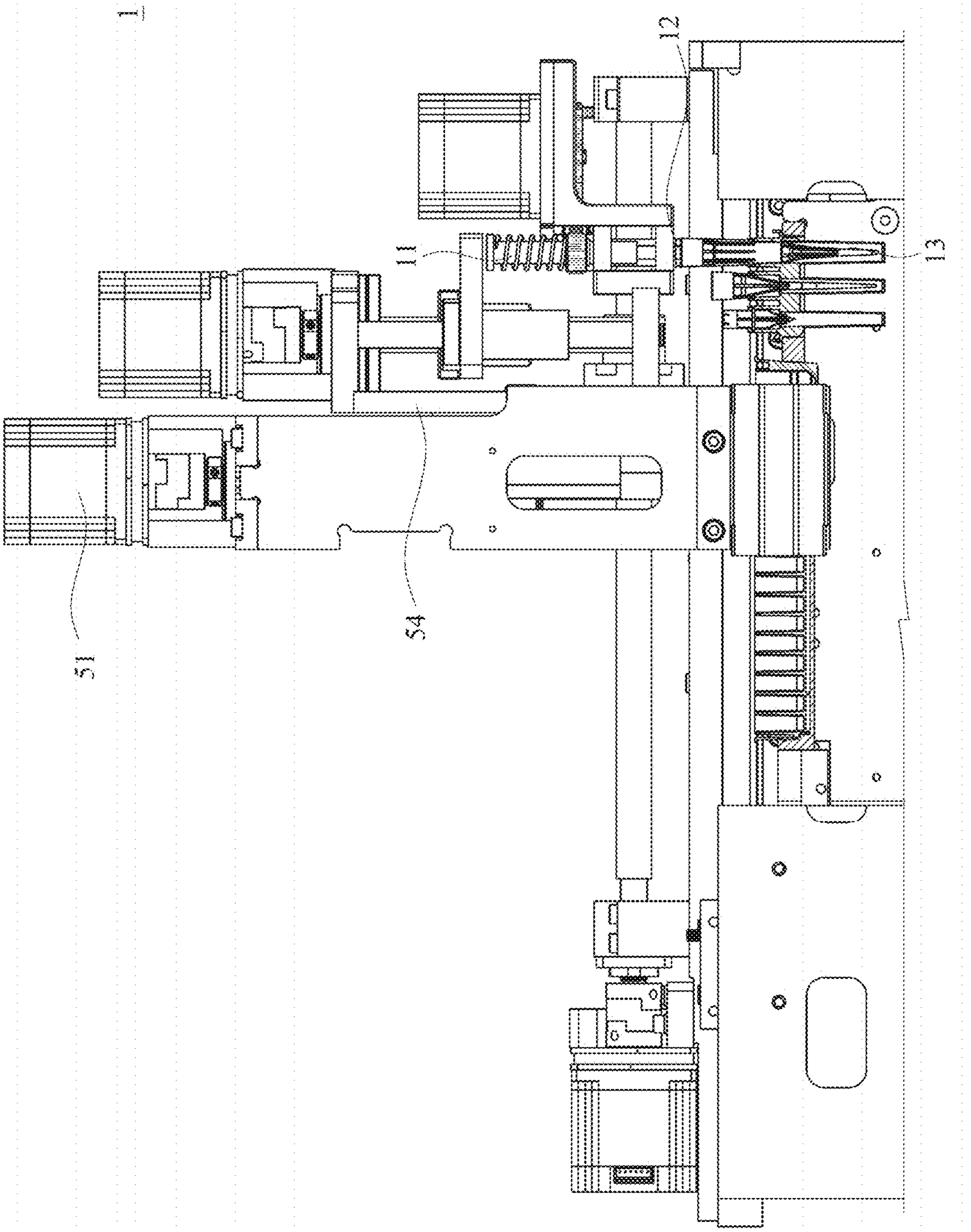
FIG. 4 is a structural schematic diagram of the rotating pipetting device for retrieving pipette tips of the present invention.
Figure 5:
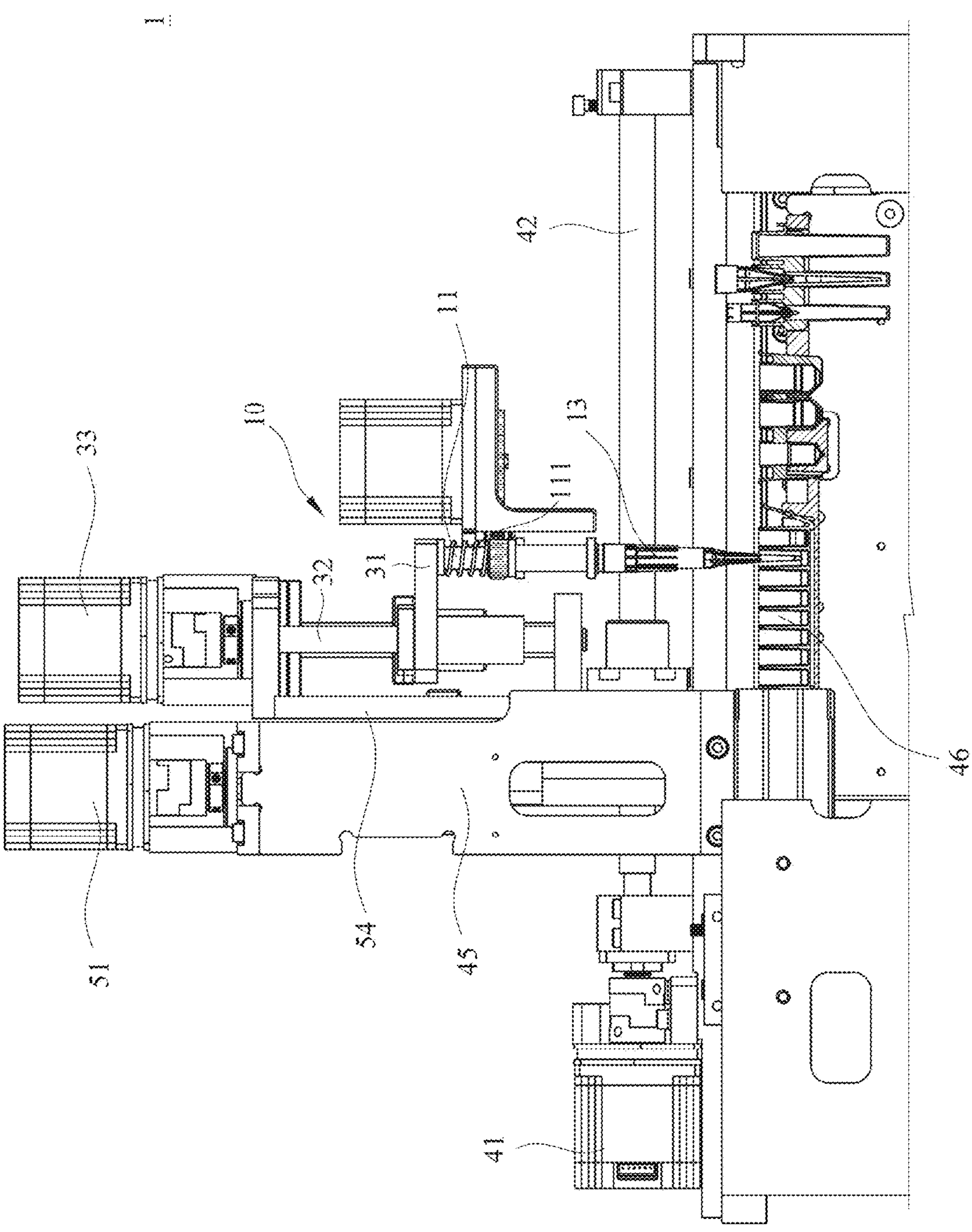
FIG. 5 is a structural schematic diagram of pipette tips sucking sample liquid of the present invention.
Figure 6:
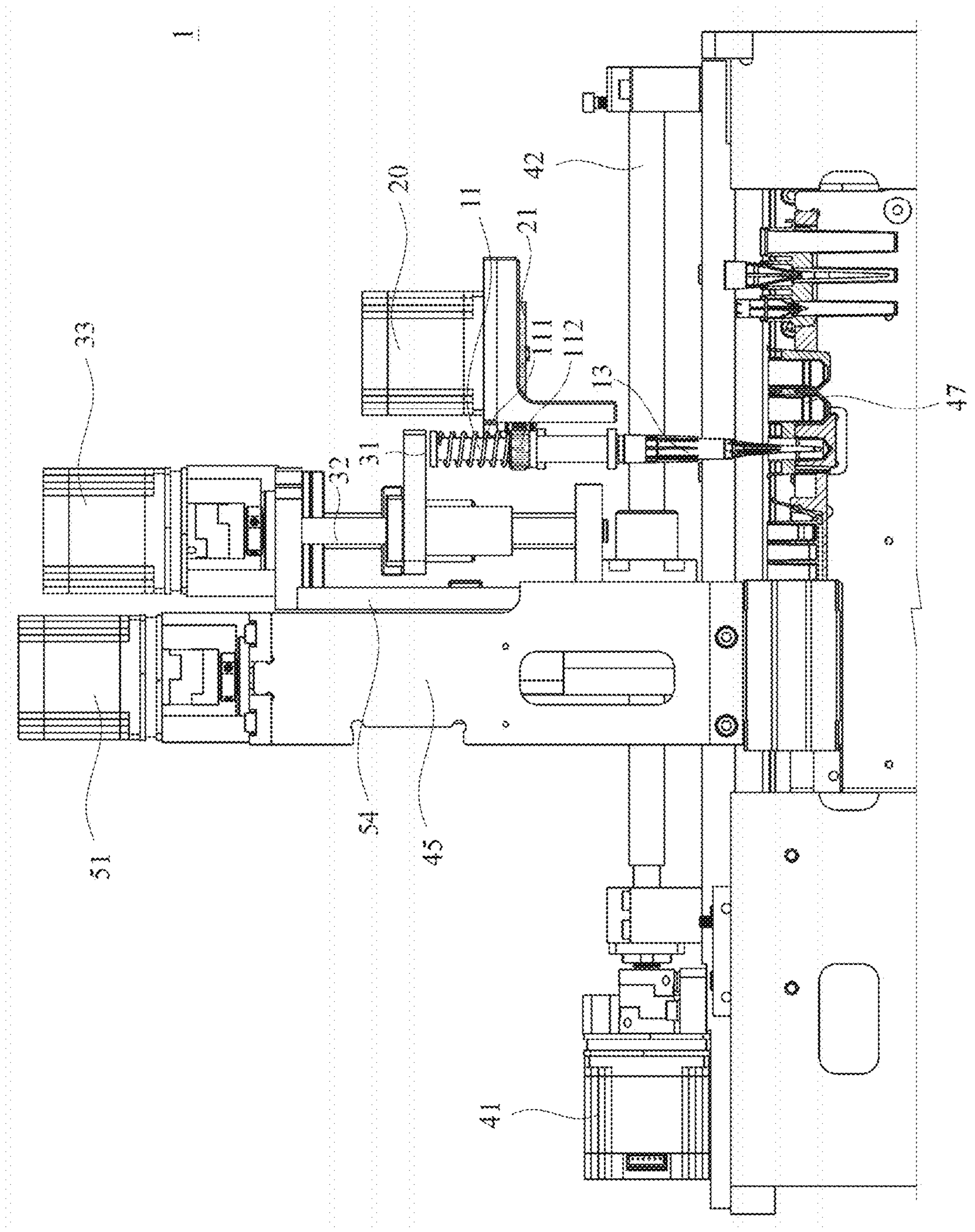
FIG. 6 is a structural schematic diagram of pipette tips rotating for stirring of the present invention.

Please refer to FIGS. 4 to 6, FIG. 4 is a structural schematic diagram of the rotating pipetting device for retrieving pipette tips of the present invention; FIG. 5 is a structural schematic diagram of pipette tips sucking sample liquid of the present invention; and FIG. 6 is a structural schematic diagram of pipette tips rotating for stirring of the present invention.

As shown in FIG. 3, the rotary pipetting device 1 is in its initial position, with the horizontal displacement member 45 being horizontally displaced by the first motor 41. As shown in FIG. 4, when the shaft rod 11 and the connecting part 12 are moved above the placement position of the pipette tip 13, the second motor 51 drives the vertical displacement member 54 to move vertically downwards, allowing the connecting part 12 to engage with the pipette tip 13 before lifting it. As shown in FIG. 5, the second motor 51 drives the vertical displacement member 54 to move vertically upwards, while the first motor 41 drives the horizontal displacement member 45 to perform horizontal displacement, positioning the plurality of pipette assemblies 10 above the placement position of chemical reagent reservoirs 46. Subsequently, the power output of the compression motor 33 drives the compression shaft 32 to move vertically downwards, thereby moving the compression plate 31 vertically downwards to compress the return spring 111 and the internal air of the shaft 11. Simultaneously, the second motor 51 drives the vertical displacement member 54 to move vertically downwards. Furthermore, the compression shaft 32 moves vertically upwards, allowing the return spring 111 to return to its original height, creating a vacuum inside the shaft rod 11 to draw up the sample liquid in the chemical reagent reservoir 46. As shown in FIG. 6, the second motor 51 drives the vertical displacement member 54 to move vertically upwards, while the first motor 41 drives the horizontal displacement member 45 to perform horizontal displacement towards reaction chambers 47. Additionally, the second motor 51 drives the vertical displacement member 54 to move vertically downwards, allowing the pipette tip 13 to be inserted into the reaction chambers 47. The power output of the compression motor 33 drives the compression plate 31 to move vertically downwards, compressing the internal air of the return spring 111 and the shaft rod 11, thereby expelling the sample liquid from the pipette tip 13. Subsequently, the second motor 51 drives the vertical displacement member 54 to move vertically upwards. The output shaft 201 of the driving motor 20 is connected to the rotating gear 21, which engaged with the limiting gear 221. The power is supplied to the driving motor 20, driving its power output to rotate the rotating gear 21, which in turn rotates the gear 112 on the shaft 11 via the rotation of the rotating gear 21, causing the pipette tip 13 to rotate and agitate the sample liquid in the reaction chamber 47.

In order to enable the objective, technical features and advantages of the invention to be more understood by a person skilled in the art to implement the invention, the invention is further illustrated by accompanying the appended drawings, specifically clarifying technical features and embodiments of the invention, and enumerating better examples. In order to express the meaning related to the features of the invention, the corresponding drawings herein below are not and do not need to be completely drawn according to the actual situation.

What is claimed is:

1. A rotary pipetting device for sucking a sample liquid, comprising:

- a plurality of pipetting assemblies, each of which includes:
  - a shaft rod, which comprises a return spring installed on the top for compressing the air inside the shaft rod, and a gear which is mounted on the shaft rod and disposed adjacent to the return spring;
  - a connecting portion disposed at the bottom of the shaft rod;
  - a pipette tip connected to the connecting portion and having a storage space, in a state when the shaft rod sucks a sample liquid, the sample liquid is stored in the storage space;
- a driving motor, which comprises an output shaft connected to a rotating gear, the rotating gear is engaged with a transmission assembly, which is engaged with the gear on the shaft rod.

2. The rotary pipetting device according to claim 1, further comprising a compression assembly including a compression plate, a compression shaft and a compression motor, wherein the compression shaft passes through the compression plate and is arranged in parallel to the plurality of the pipetting assemblies; the compression plate is disposed above the plurality of the pipetting assemblies, the compression motor is connected to the compression shaft and the power output of the compression motor is configured to be capable of driving the compression plate which is vertically movable on the compression shaft, to compress the return spring.

3. The rotary pipetting device according to claim 1, wherein the transmission assembly is a limiting gear, a rack or a belt.

4. The rotary pipetting device according to claim 3, wherein in a state where the power output of the driving motor drives the limiting gear to rotate, the gears on the plurality of pipetting assemblies are arranged adjacent to each other and rotated mutually.

5. The rotary pipetting device according to claim 1, further comprising a horizontal displacement assembly including a first motor, a conveying shaft, a shaft sleeve, a connecting plate and a horizontal displacement member, wherein the first motor is connected to the conveying shaft, the shaft sleeve is sleeved on the conveying shaft, the shaft sleeve passes through the connecting plate to fix the connecting plate on the shaft sleeve, the bottom of the horizontal displacement member is connected to one side of the connecting plate, and the power output of the first motor is configured to be capable of driving the shaft sleeve to perform horizontal displacement along the conveying shaft, thereby driving the connecting plate and the horizontal displacement member to move horizontally.

6. The rotary pipetting device according to claim 1, further comprising a vertical displacement assembly including a second motor, a transmission shaft, a housing and a vertical displacement member, wherein the second motor is connected to the transmission shaft, the transmission shaft passes through the housing, one side of the housing is connected to one side of the vertical displacement member, and the power output of the second motor is configured to be capable of driving the vertical displacement member to perform vertical displacement on the transmission shaft.

* * * * *